United States Patent
Chaboche

(10) Patent No.: US 7,363,292 B2
(45) Date of Patent: Apr. 22, 2008

(54) SYSTEM FOR SEARCHING AND SELECTING HIERARCHICALLY STRUCTURED OBJECTS

(76) Inventor: Edmond Chaboche, 28 Rue Guilleminot, Chaville (FR) 92370

( * ) Notice: Subject to any disclaimer, the term of this patent is extended or adjusted under 35 U.S.C. 154(b) by 409 days.

(21) Appl. No.: 10/257,672

(22) PCT Filed: Apr. 12, 2001

(86) PCT No.: PCT/FR01/01132

§ 371 (c)(1),
(2), (4) Date: Oct. 15, 2002

(87) PCT Pub. No.: WO01/77889

PCT Pub. Date: Oct. 18, 2001

(65) Prior Publication Data

US 2003/0105750 A1    Jun. 5, 2003

(30) Foreign Application Priority Data

Apr. 12, 2000 (FR) ................................. 00 04702

(51) Int. Cl.
*G06F 7/00* (2006.01)
*G06F 17/00* (2006.01)
(52) U.S. Cl. .................. 707/3; 707/101; 707/104.1
(58) Field of Classification Search .................. 707/3, 707/5; 715/513; 719/313
See application file for complete search history.

(56) References Cited

U.S. PATENT DOCUMENTS 5,765,149 A * 6/1998 Burrows ................. 707/5
5,920,861 A * 7/1999 Hall et al. ................. 707/9
6,732,331 B1 * 5/2004 Alexander ................. 715/513
6,874,146 B1 * 3/2005 Iyengar ................. 719/313

FOREIGN PATENT DOCUMENTS

EP    0 827 063    3/1998

OTHER PUBLICATIONS

H.P. Kumar et al., "Browsing Hierarchical data with multi-level dynamic queries and pruning", *International Journal of Human-Computer Studies*, US, vol. 46, No. 1, 1997, pp. 103-124, XP002088976.
M. Spenke et al., "Focus: The Interactive Table for Product comparison and selection", *ACM Symposium on User Interface Software and Technology, ACM*, Nov. 6, 1996, pp. 41-50, XP000728615.

* cited by examiner

*Primary Examiner*—Apu Mofiz
*Assistant Examiner*—Susan Chen
(74) *Attorney, Agent, or Firm*—Young & Thompson

(57) ABSTRACT

A system includes elements for encoding data concerning the objects by (a) setting up a table (T) with hierarchical structure of the set of attributes (Cna) and contents (Cnu) associated with the objects; and (b) setting up for each stored object a file wherein each attribute of the object and its contents is identified by the specific code assigned to the attribute-contents pair in the table. The system comprises calculating and interfacing elements for (c) constructing a first table containing the set of stored files concerning a request; (d) constructing a second table containing the set of contents present in any of the files of the first table; (e) presenting successive selections of attributes and contents in hierarchical order defined in the second table; (f) updating the first table; (g) repeating operations e) and f) until one predetermined condition is fulfilled; and (h) presenting theresult of the search.

23 Claims, 8 Drawing Sheets

FIG. 2

Figure 1:
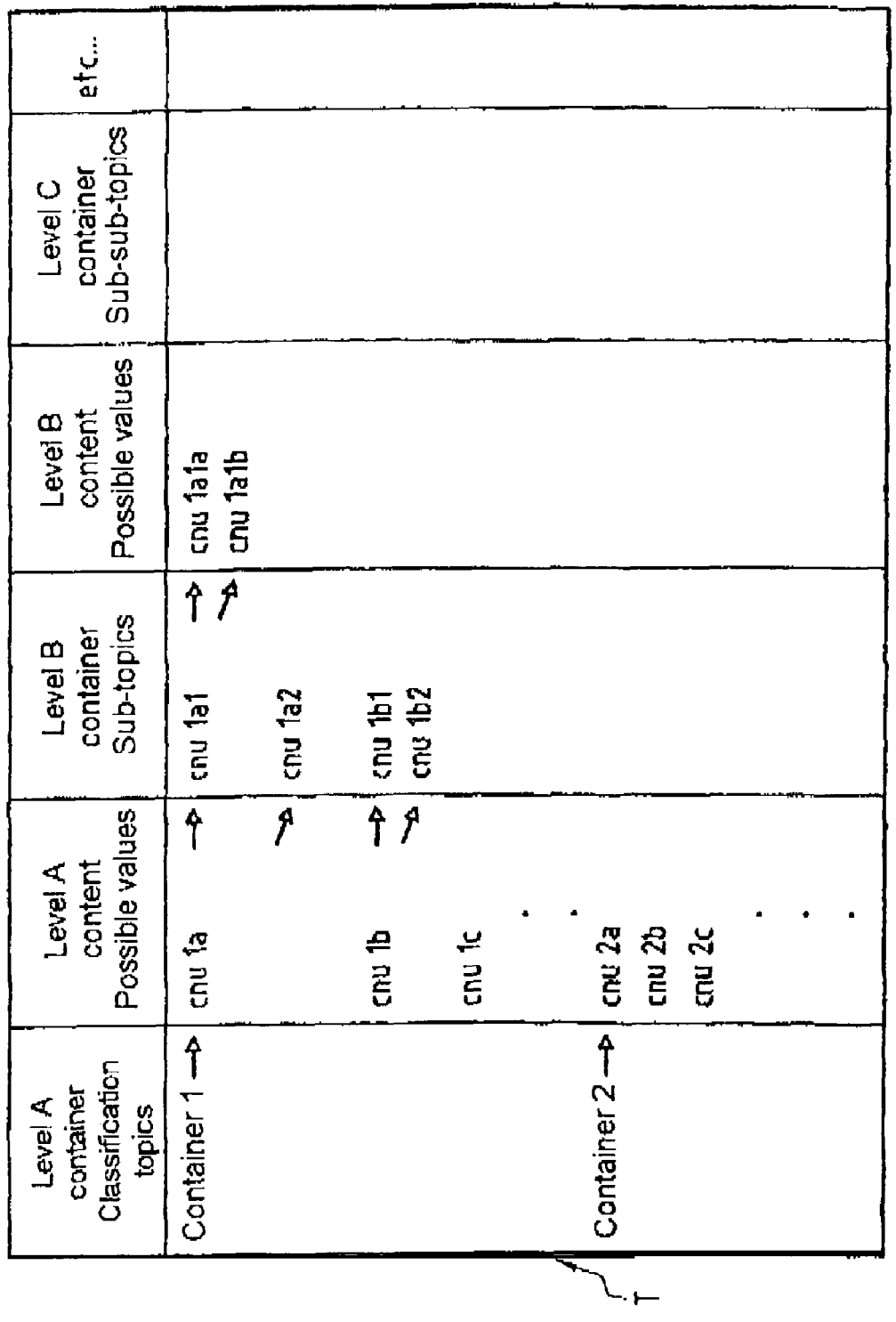

| A | B | C |
|---|---|---|
| Type of property → | Apartment → | F1, F2, F3 |
| | House → | Floor → Ground floor, 1st floor, 2nd floor → Private garden, Lift, Lift → YES, NO, YES, NO, YES, NO |
| | | Plot → <100 m², 100 to 500 m², >500 m² |
| Transaction → | Sale → | Price → <1 MF, >1 MF |
| | Rental → | Rent → <5 KF, >5 KF |
| | | Deposit → None, 3 months |
| Location → | Ile de France → | Département → 75, 92 → District, Town → 1st, 2nd, Neuilly, Nanterre |
| | Province → | Region → Aquitaine → In or near → Arcachon, Bordeaux |
| | Abroad → | Country → USA, Switzerland → State, Canton → California, Geneva |

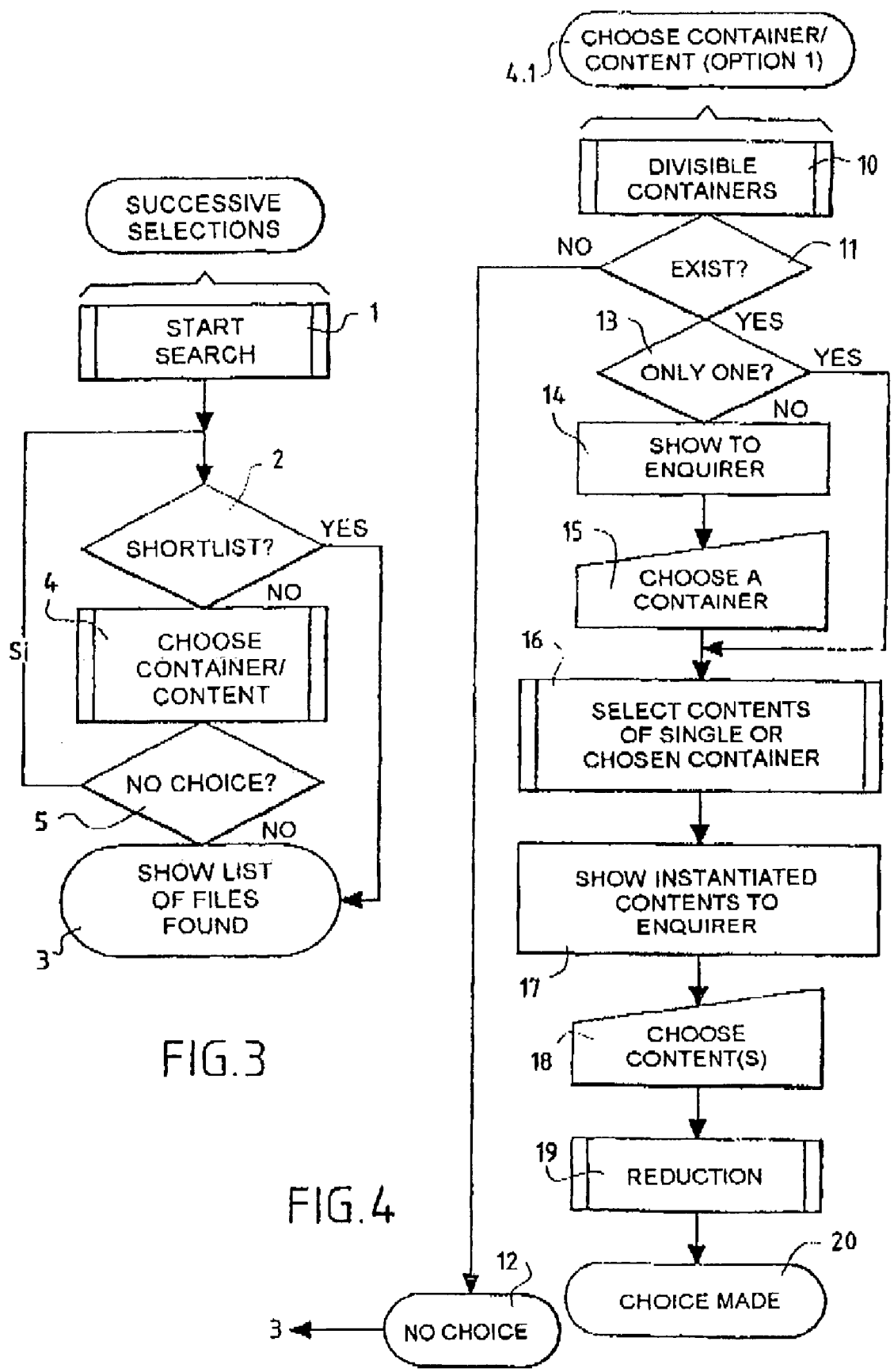

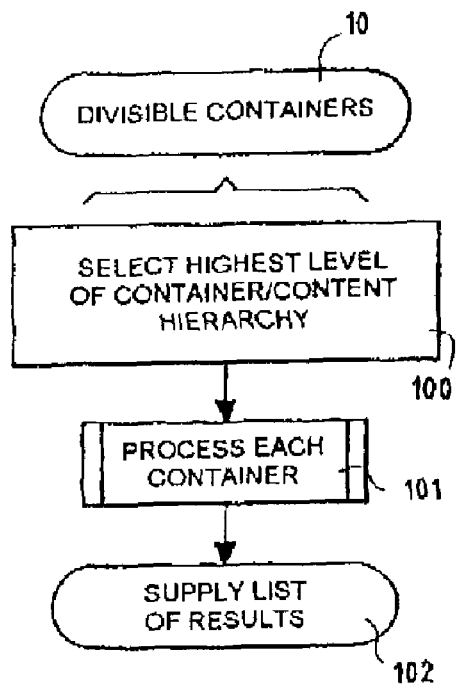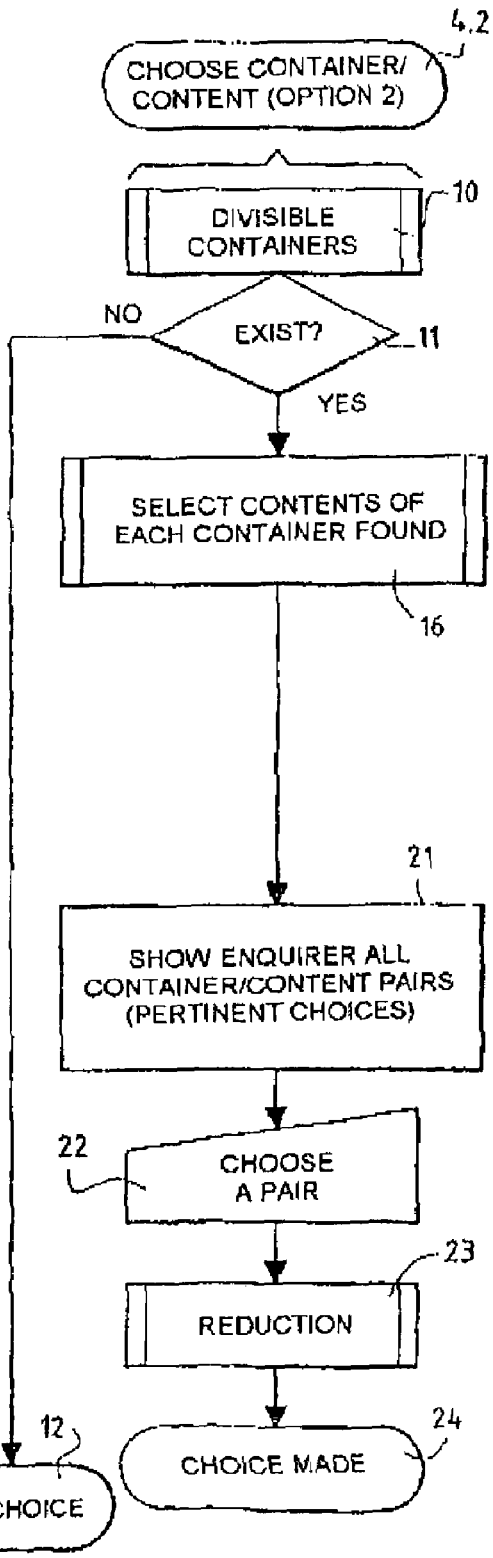

TABLE S

|    | 1 | 2 | 3 | 4 | 5 | 6 | 7 | 8 | 9 |   | n |
|----|---|---|---|---|---|---|---|---|---|---|---|
| F1 | 1 | 0 | 1 | 0 | 0 | 0 | 1 | 1 | 0 | ------- |   |
| F2 | 0 | 0 | 0 | 1 | 1 | 0 | 1 | 0 | 1 | ------- |   |
| F3 | 0 | 0 | 0 | 1 | 0 | 1 | 1 | 0 | 1 | ------- |   |
| F4 | 1 | 1 | 0 | 0 | 0 | 0 | 1 | 1 | 0 | ------- |   |

TABLE C

| 1 | 2 | 3 | 4 | 5 | 6 | 7 | 8 | 9 |   | n |
|---|---|---|---|---|---|---|---|---|---|---|
| 1 | 1 | 1 | 0 | 0 | 0 | 1 | 1 | 0 | ------- |   |

SYSTEM FOR SEARCHING AND SELECTING HIERARCHICALLY STRUCTURED OBJECTS

BACKGROUND OF THE INVENTION

The present invention relates to a method of processing data to search for and to assist with choosing objects from a set of objects stored in the form of records in a data processing system, wherein each object is associated with the value of each of several attributes, as well as a data processing and man/machine interface system for implementing the method.

Hereinafter, the term "object" designates any material or non-material entity that can be described by a number of attributes, also referred to hereinafter as containers, which attributes can have one of several given values referred to also as contents. In an ordinary database, all of the attributes or containers are common to all the records and the information from a record consists of the list of the associated values. These databases are searched using keywords, crossed criteria, etc. In very many cases, searching conventional databases can yield no response or too many responses.

Thus, to find a web site on the Internet, it is necessary to consult search engines which either give no response or offer thousands or tens of thousands of responses. The user, faced with a long list of responses, is not able to refine the query and furthermore does not know how pertinent the responses offered can be expected to be.

SUMMARY OF THE INVENTION

The invention aims to provide a data processing system for searching for objects that guarantees always to offer users responses, in the form of shortlists of pertinent responses, using data processing resources of limited power and offering fast processing and a reasonable quality/cost trade-off.

To this end, the invention proposes a data processing system for selecting objects from a set of objects stored in the form of files in said system, wherein each object is identified by the value of each of a plurality of attributes, comprising a1) means for storing a hierarchically structured table of all of the attributes and values associated with said objects, in which table said attributes are classified hierarchically in a plurality of rows, each attribute of a secondary row is attached to a value of an attribute of hierarchically higher row, and each pair consisting of an attribute and its value is associated with a specific code, a2) means for storing a file for each stored object, in which file each attribute of said object and its value is identified by the specific code assigned to said attribute-value pair in said table, and b) computation and interface means for, in response to a search request from an enquirer:

c) constructing a first table (S) containing all the stored files relating to said request, d) constructing, by means of said codes, and in accordance with said hierarchical structure of the attribute-value pairs, a second table (C) of the values present in any of said files of the first table (S), e) showing successive choices of attributes and values to, said enquirer, in the hierarchical order defined in said second table (C), f) updating said first table (S) in response to the choice by said enquirer of an attribute-value pair consecutively to said step e), by selecting in said first table (S) the files including said selected attribute-value pair, g) repeating said operations e) and f) until at least one predetermined condition is satisfied, and h) showing the result of said search to said enquirer when said condition is satisfied.

Thus the system according to the invention searches in steps, each step involving choosing an attribute or attribute from those available and choosing a value from those available in the chosen attribute or attribute. Each step leads to the presentation of only pertinent information to the enquirer, since the enquirer is shown only search criteria that lead to responses and search criteria are shown only if there are responses.

According to one feature of the invention, said computation and interface means e) for showing successive choices of attributes and values to said enquirer in the hierarchical order defined in said second table (C) comprise:

e1) means for establishing, by exploring the highest hierarchical row not yet explored in said second table (C), a list of attributes having at least two values represented in said first table (S), and one of the two means comprising:

e2) means for showing said list of attributes to said enquirer with a view to choosing one of said attributes if said list of attributes comprises at least two attributes, and e3) means for showing the values of an attribute directly to said enquirer with a view to choosing one of said values if said list of attributes comprises only said attribute.

In one embodiment of the invention, said means e2) for showing said list of attributes to said enquirer with a view to choosing one of said attributes if said list of attributes comprises at least two attributes comprise:

e21) means for establishing, in response to the choice of one of said attributes by said enquirer, a list of values of said chosen attribute represented in said first table (S), and e22) means for showing said list of values to said enquirer with a view to choosing one of said values.

In another embodiment of the invention:

said means e1) comprise means for establishing, for each of said attributes from said list of attributes, a list of the values of that attribute that are represented in said first table (S), and said means e2) comprise means for showing said enquirer all the attribute-value pairs selected by said means e1), with a view to said enquirer choosing one of said pairs.

The invention also has one or more of the following features taken singly or in combination:

said condition of the operation A) is satisfied if said list of attributes established by said means e1) is empty.

said condition of the operation executed by said means g) is satisfied if the number of records in said first table (S) is less than a predetermined number.

said computation and interface means comprise means for showing said enquirer the number of said records in the first table (S) consecutively to said operations executed by said means c) and f).

said computation and interface means comprise means for showing said enquirer a list of the attribute-value pairs previously selected consecutively to said operations executed by said means c) and f).

said computation and interface means comprise means for
showing said enquirer a list of the attribute-value pairs
which, although not selected by the enquirer, are nev-
ertheless common to all the remaining records (F),
consecutively to said operations executed by said
means c) and f).

said computation and interface means comprise means
for:

defining at least one of said attribute-value pairs consti-
tuting a priority search criterion, constructing said first table (S) and said second table (C)
of said operations executed by said means c) and d) by
selecting, from said set of records, a subset of said
records satisfying said criterion, and executing said operations executed by said means e) to h)
using said subset of records.

said definition of a priority search criterion including the
step of prompting said enquirer to choose at least one
priority criterion consecutively to said step e), adding
said priority criterion chosen by said enquirer to a list
of priority criteria, and generating said subset of
records by selecting records from said set satisfying the
priority criteria from said list.

said means for defining a priority search criterion com-
prise means for prompting said enquirer to choose at
least one priority crterion consecutively to said opera-
tion executed by said means e), means for adding said
priority criterion chosen by said enquirer to a list (P) of
priority criteria, and means for generating said subset
of records by selecting records from said set satisfying
the priority criteria from said list (P).

said system has a client-server architecture, said interface
means comprising a client terminal.

BRIEF DESCRIPTION OF THE INVENTION

Other features and advantages of the invention will
emerge from the following description of embodiments of
the invention provided by way of example only and shown
in the accompanying drawings, in which:

FIG. 1 is a table showing the hierarchical structure of all
attributes or attributes and values associated with objects in
a system according to the invention, FIG. 2 is a table similar to the FIG. 1 table, showing the
attributes and the values in the case of a practical applica-
tion, FIGS. 3 to 9 are flowcharts executed by the system
according to the invention, and FIGS. 10 to 13 are tables illustrating one example of
values coding used by the system according to the invention.

DESCRIPTION OF THE PREFEERRED
EMBODIMENTS

Reference will first be made to table T in FIG. 1 which
shows the hierarchical structure of all attributes and values
associated with objects stored in a data processing resource
and which can be searched.

The objects are represented by records F comprising:

firstly, diverse information which cannot be searched
using the mechanisms of the invention, for example
texts, pictures, digital data and/or other information of
any kind, and secondly, attribute-value (cna-cnu) pairs, each of which
can have one of several values, which belong to the
FIG. 1 hierarchical table, and which serve equally as
diverse information and search criteria.

The cna-cnu pairs of a record F constitute a subset of the
FIG. 1 table T and have the following property: if table T
includes sub-pairs cna-cnu of a particular pair cna-cnu
belonging to the record, then one of those sub-pairs exists in
the record, i.e. the record is complete.

As shown in FIG. 1, in the hierarchically structured table
T, the attributes and the values are classified hierarchically
into rows A, B, C, etc. and, each attribute of a secondary row
is attached to a value of a attribute of a hierarchically higher
row. Thus a Attribute 1 and a Attribute 2 in level or row A
of the table correspond to main classification topics.
Attribute 1 can have several possible values or values $cnu1a$,
$cnu1b$, $cnu1c$. There are four attributes in hierarchy level or
row B corresponding to sub-topics. The attributes $cnu1a1$
and $cnu1a2$ are attached to the value $cnu1a$. Similarly, the
attributes $cnu1b1$ and $enu1b2$ are attached to the value
$cnu1b$. In the same hierarchy level or row B, the attribute
$cnu1a1$ can have two possible values or values, $cnu1a1a$ or
$cnu1a1b$. By working through the tree structure of the FIG.
1 hierarchy table T, it is possible to describe all of the
attribute-value pairs of any of the records F and the hierar-
chical links of the various pairs in the record.

FIG. 2 shows an application of the FIG. 1 table T to the
field of real estate. Thus the attributes in the higher level or
row A comprise the type of property, the nature of the
transaction on that property, and the location of the property.
For the "Type of property" attribute, the value can be
"Apartment" or "House", for the "transaction" attribute, the
value can be "Sale" or "Rental", etc. In the next hierarchy
row or level B, the attributes (Numbers of rooms, Floor,
Plot, Price, etc.) are each attached to one of the values of the
higher hierarchical row: the "Number of rooms" and "Floor"
attributes are attached to the "Apartment" value and the
"Plot" attribute is attached to the "House" value.

As a result of the foregoing, each attribute-value pair in
the FIG. 1 hierarchy table T is unique and can be associated
with a specific code for designating said pairs in the records
F.

Reference will also be made to the flowcharts of FIGS. 3
to 9, which show the mechanisms employed to search a set
of records F coded in accordance with the hierarchical
structure of the FIG. 1 table.

The FIG. 3 general flowchart headed SUCCESSIVE
SELECTIONS shows successive choices of attributes and
values to an enquirer until a shortlist is obtained. Step 1
corresponds to starting a search, i.e. to preparing tables S
and C intended to reflect all of the existing records F to be
used for the search.

The table S is a table of the selected records F and their
attribute-value pairs, this first table being constantly updated
as the search proceeds.

The second table C is a table of values present in any of
the records from the first table S. If each record F is
considered as a subset of values, then the table C can be
considered as the set consisting of the union of the subsets
F, on the understanding that each attribute-value pair is
shown only once in the table C. Moreover, this table is
organized in accordance with the hierarchical structure of
the table T to reflect the hierarchy of the attribute-value
pairs. This means that the attributes are represented only
implicitly in this table, because each value has a specific
code, from which its attribute can be deduced as shown by
table T.

If, after starting the search in step 1, it is found that the
total number of stored records to be searched is less than a
predetermined value, the test 2 leads directly to showing the
enquirer a list of all the existing records in step 3.

If the number of records from the table S generated in step 1 is greater than said predetermined number, i.e. if the list is not a shortlist, test 2 leads to a attribute/value choice step 4. This step 4 corresponds to a module of which a first embodiment is shown in FIG. 4 and a second embodiment is shown in FIG. 5.

After step or module 4, whether a attribute/value choice is still possible is examined in step 5. If there is still at least one choice, test 5 loops to the input of test 2. If not, the process goes direct to step 3 showing the list of records found.

If the number of records shown to the enquirer exceeds a predetermined parameter, this indicates that it is desirable to refine the search by refining the attribute (attribute)-value criteria depending on those chosen. In other words, it is necessary to add search criteria (attributes and their values) and/or to add values for one or more existing attributes (attributes). In this case there is the option of a command to advise the manager of the definition of the criteria.

FIG. 4 shows a first embodiment 4.1 of the module 4 from FIG. 3. The module 4.1 begins with a step 10 headed DIVISIBLE ATTRIBUTES and shown in the FIGS. 6 and 7 flowcharts. The aim of the module 10 is to create a list of attributes by hierarchically searching the second table C for attributes having at least two values represented in the first table S.

Referring to FIG. 6, in step 100 the module 10 begins by exploring the highest hierarchy row not yet explored in the second table C to determine the attribute-value pairs of that row. In step 101 each attribute is processed in a manner described below with reference to FIG. 7 and in step 102 a list of attributes is provided in order to be shown to the enquirer (as described below).

Figure 7:
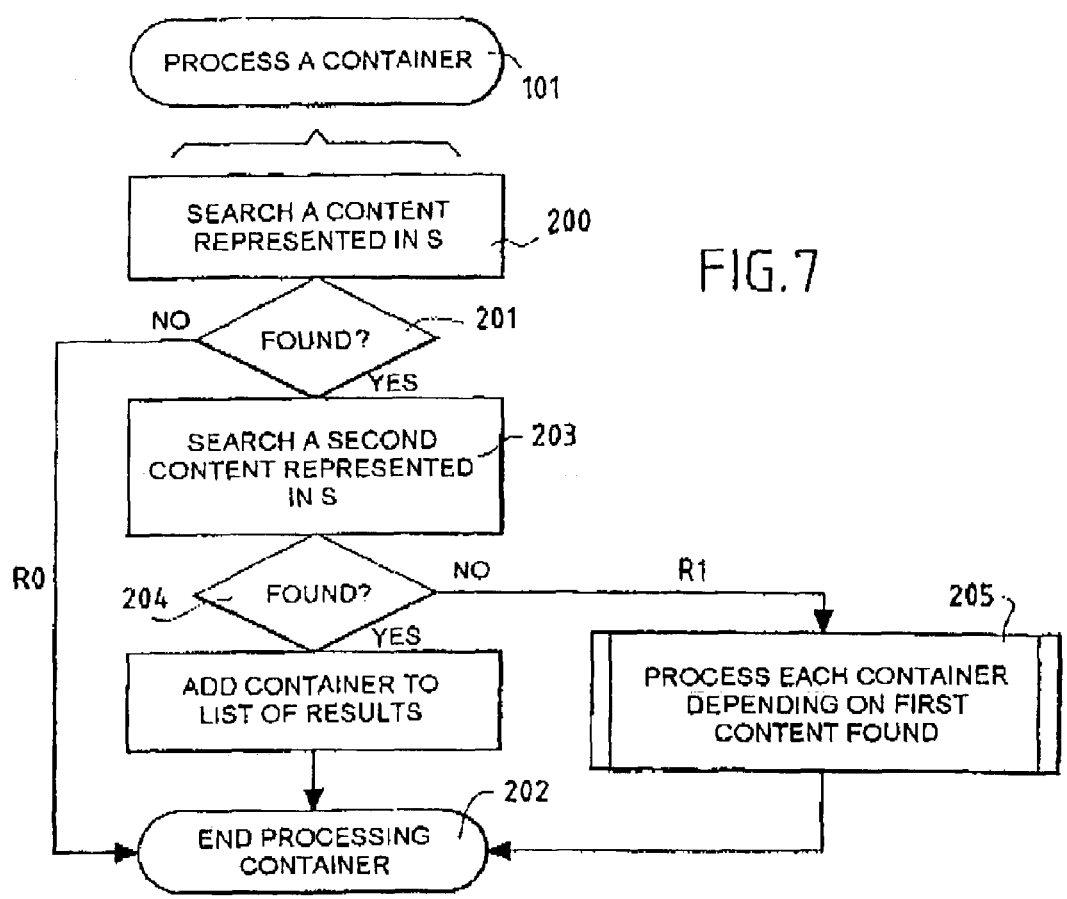

Referring to FIG. 7, step or module 101 begins with a step 200 of searching whether the attribute processed has a value represented in the table S. If no value is found in step 201, i.e. if the result is R0, the process goes direct to a step 202 on completion of the processing of the attribute concerned. If the response to test 201 is positive, the next step is a step 203 of searching whether the attribute processed has a second value represented in the table S. If the result of test 204 is negative, i.e. if the attribute has only one value R1, the attribute is ignored, but the search continues with step 205 by processing also all of the attributes dependent on the value that has been found.

If the response to test 204 is positive, the result is Rn, i.e. at least two different values have been found In the table S for the attribute being processed. The attribute processed is added in step 206 to the list of results and the processing of that attribute then ends in step 202.

The step 101 of processing a attribute (FIG. 7) is repeated for each of the attributes selected in step 100 (FIG. 6) until all the selected attributes have been used up. A list of all the attributes having at least two values represented in the table S is then available in step 102, being understood that there are not shown therein attributes having at least two values but which are hierarchically dependent on another attribute that is also in the list.

Referring again to FIG. 4, if test 11 shows that the list of the attributes 102 is empty, i.e. if there is no choice to be proposed to the enquirer, as indicated in step 12, the list of records found is shown in step 3 (FIG. 3).

If test 11 shows that the list of attributes 102 is not empty, whether the list comprises one or more attributes is examined in step 13. If the list comprises several attributes, they are shown to the enquirer in step 14, who chooses one of the attributes in step 15.

When the enquirer has chosen a attribute in step 15, or if test 13 determines that the list of the attributes 102 contains only one attribute, the SELECT VALUES module of step 16 creates a list of values represented in the table S for the single attribute or the attribute chosen by the enquirer in step 15.

Figure 8:
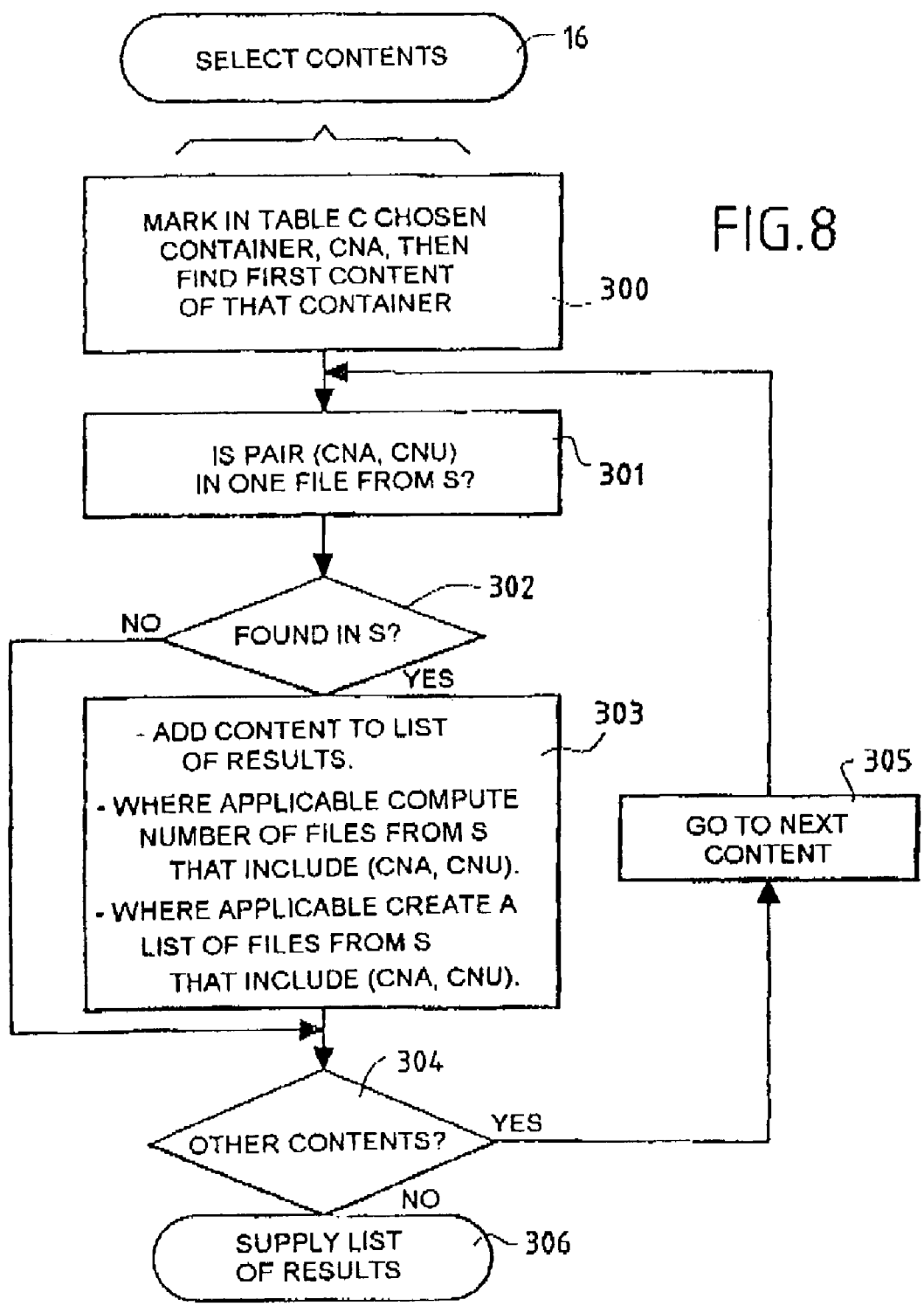

Referring to FIG. 8, the first step 300 of the SELECT VALUES module 16 consists of marking in the table C the attribute chosen in step 15 or a single attribute from the list 102, referred to hereinafter as the attribute CNA, and then finding the first value CNU of that attribute. The next step 301 searches whether the CNA-CNU pair is in a record from the table S. If this proves to be the case in step 302, in step 303 the value CNU is added to the list of the values of the attribute CNA. The number of records from the table S comprising the CNA-CNU pair is optionally computed in step 303, and a list of the records from the table S that includes the CAN-CNU pair is created.

Next, a test 304 determines if the attribute CNA contains other values. If so, the next value is processed in step 305, after which step 301 is repeated to determine if the new CNA-CNU pair is in one of the records from the table S. The steps 302, 303 and 304 are then repeated until all the values of the attribute CNA have been examined. If, during this process, it is found that a CNA-CNU pair is not part of one of the records from the table S, the response to test 302 is negative, and the next step is then a test 304, which means that the value in question is not added to the list of results.

When all the values of a attribute CNA have been examined, the list of the selected values is supplied in step 306 and shown to the enquirer in step 17 (FIG. 4). The enquirer chooses a value from those shown to him in step 18 and the next step is a reduction step 19 which eliminates from the table S all of the records that do not contain one of the attribute-value pairs indicated by the enquirer. The enquirer can optionally be shown a list of the attribute-value pairs which, although the enquirer has never selected them, are nevertheless common to all of the remaining records. These are pairs that have been deduced during the search process in order to eliminate attributes having only one possible value; this elimination stems from the choice R1 made in step 204 (FIG. 7).

After a step 20, which indicates that the enquirer has made a choice of attribute in step 15 and of value in step 18, there is a loop to the input of test 2 (FIG. 3) to determine if the list of the records contained in the table S is a shortlist or not. If it is a shortlist, the search is terminated and the next step is step 3 of showing the records found; otherwise the module 4 processed in the manner described above is repeated to explore the attributes and values successively in hierarchical order until a shortlist is obtained. A shortlist is a list in which the number of records is less than or equal to a predetermined number, for example ten records.

FIG. 5 shows a second embodiment 4.2 of the FIG. 3 module 4 in which the module 10 determines at the same time all of the divisible attributes (FIG. 6) and all the possible values of each of the divisible attributes found by the module 16 (FIG. 8). As in the FIG. 4 embodiment, the process goes direct to a step 12 returning to step 3 if it is found in step 11 that there is no attribute having at least two values represented in the table S. Otherwise, the SELECT VALUES module 16 is executed for each of the attributes found and all of the attribute-value pairs, i.e. the pairs offering a choice, are then shown to the enquirer in step 21.

In step 22 the enquirer chooses a pair and in step 23 the reduction of step 19 (FIG. 4) is performed. Step 24 indicates that a attribute-value pair has been chosen, and there is then a loop to the input of test 2, as in the FIG. 4 module. As previously indicated, the SUCCESSIVE SELECTIONS process then continues until a shortlist is obtained.

Figure 9:
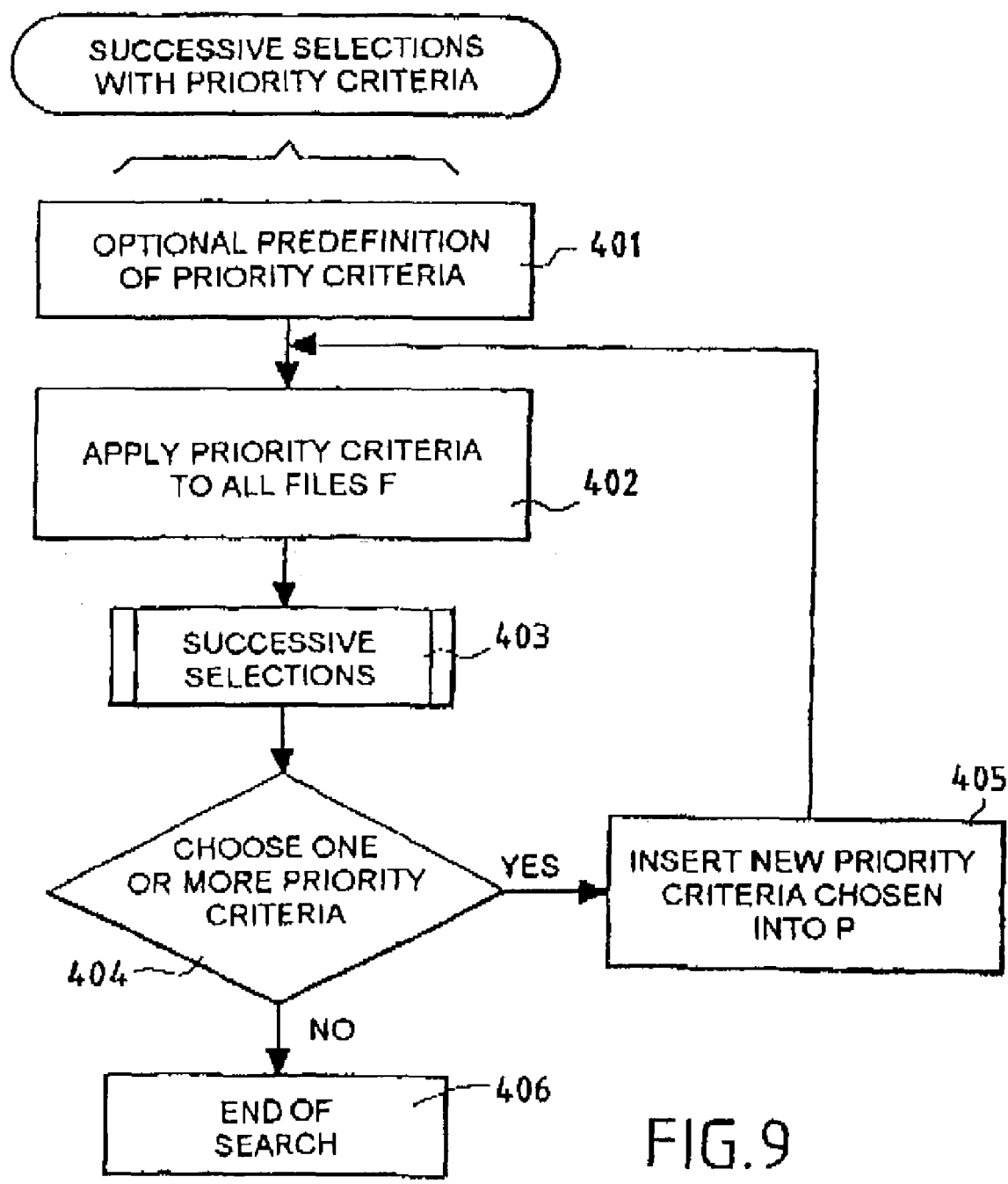

The FIG. 9 flowchart shows a different embodiment of the mechanisms from FIGS. 3 to 8 whereby the successive selection process can be initialized by applying priority criteria necessarily yielding one or more responses.

These priority selection criteria (attribute/value pairs) can be predefined, for example:

by an extract from earlier selections (as described below with reference to FIG. 9);

as a function of a dependency on the mean used to access the search system;

as a function of the prorecord of the enquirer;

as a function of the geographical location of the enquirer, previously specified by the enquirer or detected using the GPS or a like system;

by an unrestricted preliminary full text search covering all the attributes/values of all the records;

in response to the enquirer specifying the processing only of records supplied by one or more particular organizations;

etc.

the above being not an exhaustive list.

Referring to FIG. 9, step 401 corresponds to the optional predefinition of one or more priority criteria. The list P referred to hereinafter is a list of priority criteria.

The next-step 402 automatically applies to all of the records F all of the priority criteria that have been predefined, in order to prepare the tables S and C described above.

The FIG. 3 SUCCESSIVE SELECTIONS algorithm is then executed in step 403 using the records remaining after step 402 (steps 401 and 402 correspond to the search initialization phase 1); this entails successive choices by the enquirer, as previously described.

When the FIG. 3 algorithm has been executed, the enquirer can choose one or more priority criteria in step 404.

If the enquirer chooses to apply one or more priority criteria to the search in step 404, this means that the enquirer has noticed that the criterion or criteria concerned is or are more important than any the enquirer might have selected using the FIG. 3 algorithm. The enquirer therefore wishes to apply the priority criterion or criteria already obtained to all of the records F.

A positive response to test 404 therefore leads to completing in step 405 the list P of priority criteria already obtained by adding those newly chosen. By construction, the list P of priority criteria gives at least one response. The next step is step 402 in which the priority criteria from the list P completed in step 405 are applied automatically to all of the records F and the SUCCESSIVE SELECTIONS process is started again and continues until a negative response is obtained to test 404. The search then ends in step 406.

Reference will be made to the tables in FIGS. 10 to 13 which illustrate one example of coding values by tables of bits for implementing the mechanism described above.

Figure 10:
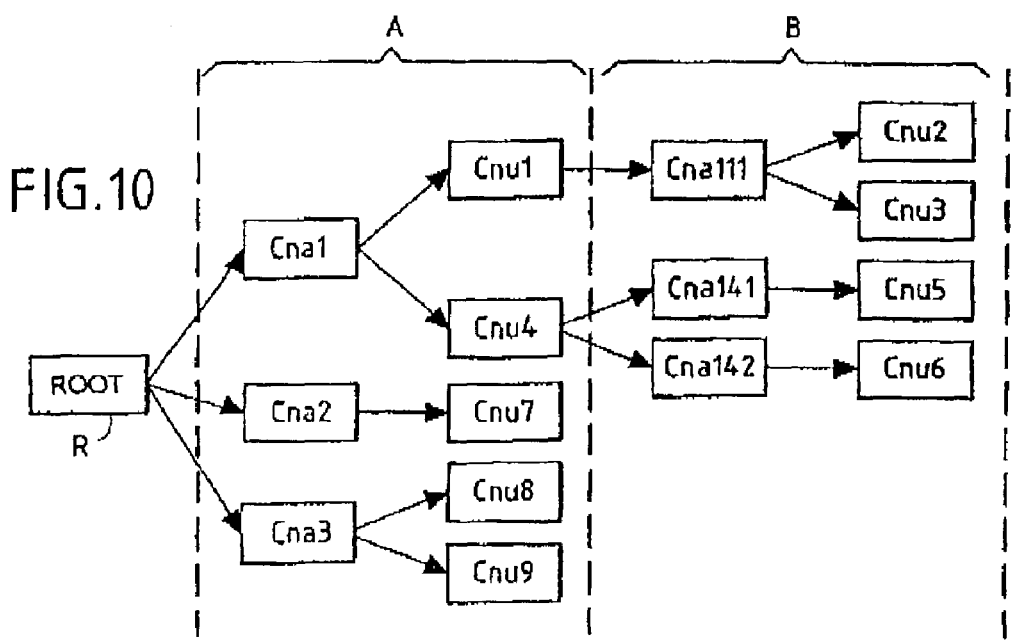

FIG. 10 is a tree form of representation equivalent to the FIG. 1 table T. In this embodiment, each value of the tree hierarchy table is numbered in the order in which it is encountered when working through the tree recursively; thus the first value that depends on the attribute Cna1 in hierarchy level or row A is numbered 1 (Cnu1 in FIG. 10), the values of the attribute Cna1.1.1 (row B) dependent on Cnu1 are numbered 2 and 3 (Cnu2 and Cnu3), etc. In the FIG. 10 example there are nine values.

Figures 11, 12, 13:
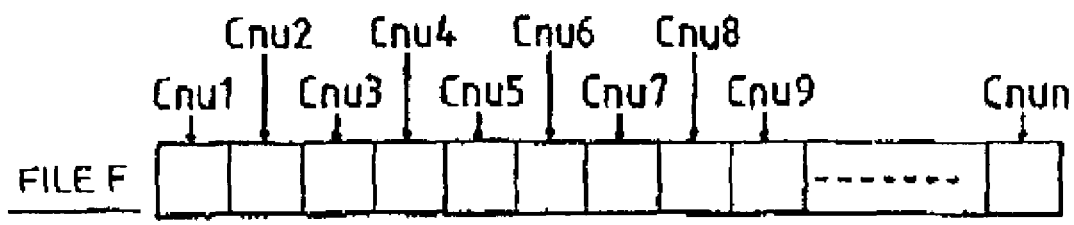

As shown in FIG. 11, the record F describing each object comprises a table having as many memory locations as there are values in the FIG. 10 table or tree, i.e. nine values in the example considered here. Each of these memory locations can take the logic value 1 if the corresponding value of the table T is included in the record and the logic value 0 if not. The position of each memory location in the record F, i.e. its address, corresponds to a value number allocated in the table T as shown in FIG. 11. Thus each memory location of the record F is associated on a one-to-one basis with a attribute-value pair from the table T.

At all times during the search process, the table S is made up of all of the records F that have been selected up until that point. Referring to FIG. 12, it is assumed that after a first choice of a attribute Cna1 by an enquirer, there remain four records F1, F2, F3 and F4 in the table S. Those records have the following values:

F1: Cnu1, Cnu3, Cnu7 and Cnu8,

F2: Cnu4, Cnu5, Cnu7 and Cnu9,

F3: Cnu4, Cnu6, Cnu7 and Cnu9, and

F4: Cnu1, Cnu2, Cnu7, and Cnu8.

Given that, in the preceding phase, the enquirer chose the attribute Cna1, the enquirer is now prompted to choose between the values Cnu1 and Cnu4. If the enquirer chooses Cnu1, the table S thereafter comprises only the records F1 and F4, and as shown in FIG. 13, the table C is deduced directly from the table S, by applying an inclusive-OR operator to each of the bits of the same order in each of the selected records (F1 and F4).

The table C is therefore organized in the same manner as a record F: the bits or memory locations constituting the table are stored in the order of hierarchical exploration of the values of the table T. The order number of the bit also enables the description of the value to be found in one or more auxiliary records, not shown (for example one record for each language). This also allows grouping of the bits of the values that are dependent on the same attribute, irrespective of the hierarchical difference between the attribute and the values concerned. For example, considered here, the order is as follows: Cnu1, Cnu2, Cnu3, Cnu4, Cnu5, CnuG, Cnu7, Cnu8, Cnu9.

The advantage of this coding mode is that it provides a very compact representation of the table T, the records F and the tables S and C if the average number of values per attribute in the table T is low. A plurality of values can be represented in a single machine word. This mode of coding and organization further offers the possibility of applying the OR logic operator to the whole of a machine word, and thus to a plurality of values at a time, which yields a considerable timesaving in finding the values represented in any of the remaining records. Moreover, when the FIG. 8 SELECT VALUES module 16 is executed, it is possible to test a plurality of values simultaneously (as many values as there are bits in a machine word), which accelerates this module. The drawback is that initializing the search necessitates scanning all the records, which can be circumvented by putting together presorted auxiliary tables for analyzing the first criterion introduced.

In practice, the FIG. 12 table S is a table of pointers to each of the records F selected in the set of records searched.

The table S initially contains a list of all the records F and a marker indicates the total number of records selected. In each step of the search, all the records up to the marker are analyzed, the records retained are pushed to one end of the table, and the marker is moved to indicate the new number of remaining records.

The rejected records can optionally be compacted at the other end of the table, which can therefore be segmented as a function of the search steps so that a search step can be returned to quickly.

As a result of the foregoing, the method and the system described are particularly suitable for multicritera searching when the topic of the search allows the criteria to be organized in a hierarchical manner. Of course, the hierarchical tree or structure of the table T varies as a function of the topic considered, i.e. is not the same according to whether the topic relates, for example, to automobiles, real estate, domestic appliances, etc. The search method described can be preceded by a traditional search, for example using keywords, to select the topic to constitute the root R of all the attributes to be searched in the manner described with reference to FIGS. 3 to 9.

The data processing system for implementing the mechanisms described requires data storage means to store the table T, the records F and the tables C and S, computation means to execute the process described with reference to FIGS. 3 to 9, and interface means for showing choices to the enquirer, enabling the enquirer to make choices, and for showing the enquirer the result of those choices. The data processing system can be of any kind, in particular a client-server architecture system accessed via a network such as the Internet from a client terminal such as a personal computer, a mobile telephone with data entry or voice recognition, etc.

The choices offered to an enquirer can be shown to the enquirer on the screen of the terminal in the form of dynamic pages consisting of one or more of the following windows, for example:

- a window showing a reactive geographical map with color shades or pictograms depending on the number of responses specific to each location (country, region, county, town);
- a window representing reactive vertical histograms showing prices, measurements or qualities (weight, size, area, room size, distance, timetable, period, color, etc.);
- a window of remaining possibilities with the selection criteria (attributes or attributes) still available and, for each of those criteria, a list of the values or values available, opposite the number of responses, shown in the form of horizontal histograms or pull-down menus;
- a window representing the choices already made by the enquirer in the form of a virtual record comprising a list of attributes and values that is added to as and when successive choices are made;
- a window of results summarized in the form of two-dimensional tables with reactive elements (photos, texts, headings, logos, pull-down menus, etc.) or in the form of dynamic cumulative totals shown graphically (pie charts, histograms, etc.);

etc.

The elements of the various windows are reactive in the sense that they enable a choice to be made by using a mouse to move a pointer over the elements concerned, as is now the norm.

It goes without saying that the embodiments described are merely examples which can be modified without departing from the scope of the invention, in particular by substituting technical equivalents.

The invention claimed is:

1. A data processing system for selecting objects from a set of objects stored in said system, wherein each one of said set of objects belongs to a set of predefined categories and each one of said predefined categories is defined by a predefined attribute-value pair comprising an attribute and a value of said object, said system comprising:

a first storing means for storing a tree-structured table of all said predefined attribute-value pairs associated with said stored objects, said attributes and said values being classified hierarchically in several levels in said table, each said attribute in a subordinate level being attached to one of said values of a higher-level attribute and each said attribute-value pair being associated with a specific binary code, a second storing means for storing a record for each stored object, said record comprising a list of all the specific binary codes attached respectively to said attribute-value pairs belonging to said stored object, and a computation and interface means for, in response to a search request from an enquirer, performing the operations of:

i) constructing a first table containing all the stored records relating to said request, ii) constructing, by means of said binary codes, and in accordance with said tree-structure of said predefined attribute-value pairs, a second table of the values present in any of said records of said first table, iii) showing successive choices of attributes and values to said enquirer, in the hierarchical order defined in said second table, iv) updating said first table in response to the choice by said enquirer of an attribute-value pair consecutively to said operation iii), by selecting in said first table the records including said selected attribute-value pair, v) repeating said operations ii), iii), and iv) until at least one predetermined condition is satisfied, and vi) showing the result of said search to said enquirer when said condition is satisfied.

2. A system according to claim 1, wherein said computation and interface means for showing successive choices of attributes and values to said enquirer in the hierarchical order defined in said second table comprise:

means for establishing, by exploring the highest hierarchical level not yet explored in said second table, a list of attributes having at least two values represented in said first table, and one of the two means comprising:

a first showing means for showing said list of attributes to said enquirer with a view to choosing one of said attributes if said list of attributes comprises at least two attributes, and a second showing means for showing the values of an attribute directly to said enquirer with a view to choosing one of said values if said list of attributes comprises only said attribute.

3. A system according to claim 2, wherein said first showing means for showing said list of attributes to said enquirer with a view to choosing one of said attributes if said list of attributes comprises at least two attributes comprise:

means for establishing, in response to the choice of one of said attributes by said enquirer, a list of values of said chosen attribute represented in said first table, and means for showing said list of values to said enquirer with a view to choosing one of said values.

4. A system according to claim 2, wherein:

said establishing means comprise means for establishing, for each of said attributes from said list of attributes, a list of the values of that attribute that are represented in said first table, and said first showing means comprise means for showing said enquirer all the attribute-value pairs selected by said establishing means, with a view to said enquirer choosing one of said pairs.

5. A system according to claim 2, wherein said condition of the operation v) is satisfied if said list of attributes established by said establishing means is empty.

6. A system according to claim 1, wherein said condition of the operation executed by said operation v) is satisfied if the number of records in said first table is less than a predetermined number.

7. A system according to claim 1, wherein said computation and interface means comprise means for showing said enquirer the number of said records in the first table consecutively to said operations executed by said operations i) and iv).

8. A system according to claim 1, wherein said computation and interface means comprise means for showing said enquirer a list of the attribute-value pairs previously selected consecutively to said operations executed by said operations i) and iv).

9. A system according to claim 1, wherein said computation and interface means comprise means for showing said enquirer a list of the attribute-value pairs which, although not selected by the enquirer, are nevertheless common to all the remaining records, consecutively to said operations executed by said operations i) and iv).

10. A system according to claim 1, wherein said computation and interface means comprise means for:
    defining at least one of said attribute-value pairs constituting a priority search criterion,
    constructing said first table and said second table of said operations executed by said operations i) and ii) by selecting, from all of said records, a subset of said records satisfying said criterion, and
    executing said operations executed by said operations i) to vi) using said subset of records.

11. A system according to claim 10, wherein said means for defining a priority search criterion comprise means for prompting said enquirer to choose at least one priority criterion consecutively to said operation executed by said operation iii), means for adding said priority criterion chosen by said enquirer to a list of priority criteria, and means for generating said subset of records by selecting records from said set satisfying the priority criteria from said list of priority criteria.

12. A system according to claim 1 having a client-server architecture, said interface means comprising a client terminal.

13. A data processing method for selecting objects from a set of objects stored in the form of records in a data processing system, wherein each one of said set of objects belongs to a set of predefined categories and each one of said predefined categories is defined by a predefined attribute-value pair comprising an attribute and a value of said object, said method comprising the steps of:
    coding the data related to said objects by the sub-steps of
    a) establishing a treestructured table of all said predefined attributevalue pairs associated with said stored objects, said attributes and said values being classified hierarchically in several levels in said table, each said attribute in a subordinate level being attached to one of said values of a higher-level attribute and each said attribute-value pair being associated with a specific binary code,
    b) establishing a record for each stored object, said record comprising a list of all the specific binary codes attached respectively to said attributevalue pairs belonging to said stored object, and
    in response to a search request from an enquirer, the sub-steps of:
    c) constructing a first table containing all the stored records relating to said request,
    d) constructing, by means of said binary codes, and in accordance with said treestructure of said predefined attribute-value pairs, a second table of the values present in any of said records of said first table,
    e) showing successive choices of attributes and values to said enquirer, in the hierarchical order defined in said second table,
    f) updating said first table in response to the choice by said enquirer of an attribute-value pair consecutively to said sub-step e), by selecting in said first table the records including said selected attribute-value pair,
    g) repeating said sub-steps d), e) and f) until at least one predetermined condition is satisfied, and
    h) showing the result of said search to said enquirer when said condition is satisfied.

14. A method according to claim 13, wherein said sub-step e) comprises:
    e1) establishing, by exploring the highest hierarchical level not yet explored in said second table, a list of attributes having at least two values represented in said first table,
    and one of the two sub-steps comprising:
    e2) showing said list of attributes to said enquirer with a view to choosing one of said attributes if said list of attributes comprises at least two attributes, and
    e3) showing the values of an attribute directly to said enquirer with a view to choosing one of said values if said list of attributes comprises only said attribute.

15. A method according to claim 14, wherein said sub-step e2) for showing said list of attributes to said enquirer with a view to choosing one of said attributes if said list of attributes comprises at least two attributes comprises:
    e21) establishing, in response to the choice of one of said attributes by said enquirer, a list of values of said chosen attribute represented in said first table, and
    e22) showing said list of values to said enquirer with a view to choosing one of said values.

16. A method according to claim 14, wherein:
    said sub-step e1) comprises establishing, for each of said attributes from said list of attributes, a list of the values of that attribute that are represented in said first table, and
    said sub-step e2) comprises showing said enquirer all the attribute-value pairs selected at said sub-step e1), with a view to said enquirer choosing one of said pairs.

17. A method according to claim 14, wherein said condition of the sub-step g) is satisfied if said list of attributes established at said sub-step e1) is empty.

18. A method according to claim 13, wherein said condition of the operation executed at said sub-step g) is satisfied if the number of records in said first table is less than a predetermined number.

19. A method according to claim 13, further comprising showing said enquirer the number of said records in the first table consecutively to said operations executed by said sub-steps c) and f.

20. A method according to claim 13, further comprising showing said enquirer a list of the attribute-value pairs previously selected consecutively to said operations executed by said sub-steps c) and f).

21. A method according to claim 13, further comprising showing said enquirer a list of the attribute-value pairs which, although not selected by the enquirer, are nevertheless common to all the remaining records, consecutively to said operations executed by said sub-steps c) and f).

22. A method according to claim 13, further comprising:
defining at least one of said attributevalue pairs constituting a priority search criterion,
constructing said first table and said second table of said operations executed at said sub-steps c) and d) by selecting, from all of said records, a subset of said records satisfying said criterion, and
executing said sub-steps e) to h) using said subset of records.

23. A method according to claim 22, wherein defining at least one of said attribute-value pairs constituting a priority search criterion comprises the step of prompting said enquirer to choose at least one priority criterion consecutively to said sub-step e), adding said priority criterion chosen by said enquirer to a list of priority criteria, and generating said subset of records by selecting records from said set satisfying the priority criteria from said list of priority criteria.

\* \* \* \* \*